United States Patent
Osthoff et al.

(10) Patent No.: US 7,558,953 B2
(45) Date of Patent: Jul. 7, 2009

(54) LOADING DATA INTO A MOBILE TERMINAL

(75) Inventors: Harro Osthoff, Nürnburg (DE); Bernard Smeets, Dalby (SE); Christian Gehrmann, Lund (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 792 days.

(21) Appl. No.: 10/500,742

(22) PCT Filed: Dec. 20, 2002

(86) PCT No.: PCT/EP02/14609

§ 371 (c)(1),
(2), (4) Date: Dec. 9, 2004

(87) PCT Pub. No.: WO03/060673

PCT Pub. Date: Jul. 24, 2003

(65) Prior Publication Data

US 2005/0091501 A1 Apr. 28, 2005

Related U.S. Application Data

(60) Provisional application No. 60/350,670, filed on Jan. 22, 2002.

(30) Foreign Application Priority Data

Jan. 18, 2002 (EP) ................................ 02388007

(51) Int. Cl.
*H04L 9/00* (2006.01)

(52) U.S. Cl. ..................................... 713/161; 713/181

(58) Field of Classification Search ................ 713/160, 713/161, 176, 181, 193, 200, 201; 370/474; 235/376, 380, 487, 492
See application file for complete search history.

(56) References Cited

U.S. PATENT DOCUMENTS

| | | | | |
|---|---|---|---|---|
| 4,831,245 A | * | 5/1989 | Ogasawara | 235/492 |
| 5,689,825 A | * | 11/1997 | Averbuch et al. | 455/418 |
| 6,023,620 A | | 2/2000 | Hansson | |
| 6,167,521 A | | 12/2000 | Smith et al. | |
| 6,481,632 B2 | * | 11/2002 | Wentker et al. | 235/492 |
| 2001/0002912 A1 | * | 6/2001 | Tony et al. | 370/487 |
| 2004/0103316 A1 | * | 5/2004 | Gehrmann | 713/201 |
| 2006/0236111 A1 | * | 10/2006 | Bodensjo et al. | 713/176 |

FOREIGN PATENT DOCUMENTS

| | | |
|---|---|---|
| DE | 19543843 | 5/1997 |
| EP | 0918420 | 5/1999 |
| EP | 0959635 | 11/1999 |
| EP | 1113359 | 7/2001 |
| EP | 1349405 | 10/2003 |
| WO | WO0025278 A1 * | 5/2000 |

* cited by examiner

*Primary Examiner*—Gilberto Barron, Jr.
*Assistant Examiner*—Hadi Armouche
(74) *Attorney, Agent, or Firm*—Michael Cameron (57) ABSTRACT

Disclosed is a method of loading data, such as software, into a mobile terminal, where the data is loaded from a loading station, and the data comprises payload data and header data. The mobile terminal accepts the data conditioned on a verification process based on the header data. The step of receiving the data further comprises the steps of receiving a header message including the header data from the loading station by the mobile terminal, verifying the received header data by the mobile terminal, and receiving at least a first payload message including the payload data, if the header data is verified successfully.

29 Claims, 5 Drawing Sheets

LOADING DATA INTO A MOBILE TERMINAL

This patent application claims the benefit of priority from U.S. Provisional Patent Application Ser. No. 60/350,670 filed on Jan. 22, 2002. This application incorporates by reference the entire disclosure of U.S. Provisional Patent Application Ser. No. 60/350,670.

This invention relates to a method of loading data into a mobile terminal. The invention further relates to a system for loading data into a mobile terminal. The invention further relates to a loading station and a mobile terminal for use in such a system.

Many mobile terminals, such as mobile phones or other mobile electronic equipment, comprise software and other data which are vital for the proper functioning of the mobile terminal. Hence, in order to maintain the integrity of the mobile terminal, it is important that only approved software and data is loaded into the mobile terminal. For example, in a service situation, the flash memory of a mobile terminal may be flashed in order to install or update the software controlling the mobile terminal.

U.S. Pat. No. 6,167,521 discloses a method of loading new code into a logical subregion of a device which is controlled by an authority. According to this prior art method, the authority prepares a message comprising the new code and certain parameters which specify requirements on the execution environment for the new code to run. The authority sends the generated message to the device which, upon receipt of the message, performs an authentication of the authority and verifies whether the parameters are valid for the current execution environment. If yes, the device loads the received new code into the corresponding logical subregion.

However, the above prior art method involves the problem that, if the verification fails, the complete message has to be retransmitted, thereby resulting in an inefficient method of loading software, in particular, if the transmission is performed over a low bandwidth channel or a noisy channel.

The above and other problems are solved when a method of loading data into a mobile terminal, the method comprising the steps of receiving the data from a loading station by the mobile terminal, the data comprising payload data and header data; and accepting the data by the mobile terminal conditioned on a verification process based on the header data is characterized in that the step of receiving the data further comprises the steps of receiving a header message including the header data from the loading station by the mobile terminal;

verifying the received header data by the mobile terminal;

receiving at least a first payload message including the payload data, if the header data is verified successfully.

Consequently, as the payload data is only received, if the verification of the header data is successfully completed, the risk of receiving incorrect data is significantly reduced. Therefore, the loading process is more efficient as less re-transmissions of the payload occur.

It is a further advantage of the invention that it requires less storage space in the mobile terminal, as no intermediate storage for the payload data is required during the verification process. This is a particular advantage in devices with limited storage capacity, such as mobile terminals.

The payload data may be any type of data to be transmitted of the mobile terminal. The method according to the invention is particularly well-suited for security sensitive data, for example software, software updates or other program code means which control the operation of the mobile terminal, as the receipt of incorrect software or process data, due to errors or an adversary, may cause the mobile terminal to malfunction or to stop functioning at all. Examples of such software include application software and preloader software which is loaded prior to application software and which organises the download of the application software. Other examples of data include Internal RAM (IRAM) data, such as software which is directly loaded into the IRAM.

The header data may comprise version information, requirements on the execution environment, such as types, manufacturers, and/or models of compatible mobile terminals, processors, chip sets, memories, etc., types and/or versions of operating systems or other software already installed in the mobile terminal, or the like. The header data may further include a manufacturer identification, a software provider identification, customer identification, or the like, access control lists, etc.

In a preferred embodiment of the invention, the header data comprises a first cryptographic data item and the step of accepting the data by the mobile terminal comprises the step of performing a cryptographic verification process based on the first cryptographic data item. Consequently, the authority issuing the payload data to be received may be authenticated prior to the actual reception of the payload data, thereby further reducing the risk of erroneous transmission of payload data and increasing the efficiency of the method.

Preferably, the cryptographic data item includes a cryptographic checksum where the term cryptographic checksum relates to a value which is computed by the sender of a message, based on the data the message contains and a secret key, and passed along with the data to a recipient. Thus, the cryptographic checksum may be used by the recipient to authenticate that the data has not been tampered with. The recipient of the data recomputes the cryptographic checksum and compares it with the cryptographic checksum passed with the data; if they match, the recipient may trust that the data was not tampered with during transmission. Hence, an important property of a cryptographic checksum is that without knowing the secret key, a malicious interceptor has only an infinitesimally small chance of being able to construct an altered message with a valid corresponding checksum. For example, in order to calculate a cryptographic checksum, a message digest of the message may be calculated, e.g. by a one-way-hash function, which generates a condensed representation of the message where it is computationally infeasible to reproduce the message which corresponds to a given message digest, or to find two different messages which produce the same message digest. Any change to a message in transit will, with very high probability, result in a different message digest, and the signature will fail to verify. Examples of such functions include the Secure Hash Algorithm (SHA-1), MD4, MD5, or the like. Preferably, the resulting message digest is encrypted, or a signature is calculated for the message digest, in order to generate the cryptographic checksum. Preferably, asymmetric, public-key based cryptographic methods such as the RSA method developed by Ron Rivest, Adi Shamir, and Leonard Adleman, the Digital Signature Algorithm (DSA), or the like, are used. Alternatively, symmetric cryptographic methods such as Message Authentication Code (MAC) schemes may be used.

Signing/encrypting the message digest rather than the message often improves the efficiency of the process, because the message digest is usually much smaller in size than the message.

Hence, the verification process may include, but is not limited to, a verification of whether the execution environment of the mobile terminal is compatible with the parameters specified by the header data, a verification of access control parameters, and a cryptographic verification based on the cryptographic data item, e.g. including an integrity check and authentication of the origin of the header data.

It is an advantage of the invention that it provides protection against unauthorised reprogramming of a mobile terminal.

In a further preferred embodiment, the payload data is divided into a number of blocks of payload data, and the step of receiving the payload data further comprises the steps of receiving a number of payload messages each comprising one of the blocks of payload data; and storing in a storage medium each of the received number of blocks of payload data. Hence, as only one block of payload data is received at a time, the requirements for intermediate storage space in the mobile terminal are further reduced.

In another preferred embodiment of the invention, the payload data is processed prior to transmitting it to the mobile terminal. For example, the data may be encrypted in order to avoid interception and/or the data may be compressed in order to reduce transmission time, bandwidth requirements, requirements for the intermediate storage capacity at the mobile terminal, and/or the complexity of the calculation of a cryptographic checksum. Correspondingly, the method further comprises the step of processing the payload data conditioned on the step of accepting the data by the mobile terminal, e.g. uncompressing the compressed data.

Furthermore, this is particularly advantageous, when the storage medium is divided into a number of storage blocks each having a predetermined size; and each of the number of blocks of payload data have a block size corresponding to the size of storage blocks. An example of such memory is flash memory, also called "flash RAM", a type of constantly-powered nonvolatile memory that can be erased and reprogrammed in units of memory called blocks.

In a further preferred embodiment of the invention, the payload data is divided into a number of blocks of payload data; the method further comprises the step of receiving a corresponding number of message digests related to respective ones of the number of blocks of payload data; the step of receiving the payload data further comprises the step of receiving a number of payload messages each including one of the number of blocks of payload data; and the step of accepting the data by the mobile terminal further comprises, for each of the number of blocks of payload data, the steps of
accepting the block of payload data by the mobile terminal conditioned on a cryptographic verification process based on a corresponding one of the message digests;
processing the accepted block of payload data;
storing the processed block of payload data in a storage medium.

Hence, instead of downloading the data unprocessed into the storage medium, subsequently loading it into RAM, processing it, and storing it again, the method according to this embodiment only requires one storage action for each block of data, thereby increasing the efficiency of the loading process.

In a yet further preferred embodiment of the invention, the cryptographic verification process used in the step of accepting a first block of payload data received after a second block of payload data is further based on a result of a cryptographic verification process used in a previous step of accepting the second block of payload data. Consequently, the cryptographic verification process is performed incrementally, where a message digest of a data block depends on all, or at least some of, the previous data blocks and/or their respective message digests, thereby increasing the security of the loading process, as all data blocks are interconnected.

In yet another preferred embodiment of the invention, the payload data comprises an update of existing data loaded in the mobile terminal; and the method further comprises the step of only loading the blocks of payload data which differ from a corresponding block of the existing data. Consequently, the amount of data to be transmitted may be significantly reduced. For example, if the payload data comprises a software patch to an already installed software, the changes are often confined to a small number of memory blocks. In this case, downloading only the effected blocks is considerably more efficient than downloading an entire new version of the software.

In a preferred embodiment of the invention, the first cryptographic data item includes a first message digest encrypted with a private key of an authority; and the step of accepting the data by the mobile terminal comprises the steps of
calculating a second message digest of the received header data and the received payload data;
decrypting the first message digest with a public key of said authority; and
comparing the decrypted first message digest with the calculated second message digest.

In another preferred embodiment of the invention, the header data further comprises a signed key to be used in the verification process by the mobile terminal as a public key of the authority distributing the payload data.

When the header data further comprises a second cryptographic data item, and the step of verifying the header data comprises the step of performing a cryptographic verification of the header data based on the second cryptographic data item, the security of the method is further increased, as the header is checked separately.

The present invention can be implemented in different ways including the methods described above and in the following, a system, a computer program, a computer readable medium and various product means, each yielding one or more of the benefits and advantages described in connection with the first-mentioned method, and each having one or more preferred embodiments corresponding to the preferred embodiments described in connection with the first-mentioned method.

It is noted that the features of the methods described above and in the following may be implemented in software and carried out in a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

The invention further relates to a method of uploading data into a mobile terminal, the method comprising the step of transmitting the data by a loading station to the mobile terminal, the data comprising payload data and header data for use by the mobile terminal in a verification process when accepting the data;

characterised in that the step of transmitting the data further comprises the step of transmitting a header message including the header data to be verified by the mobile terminal before transmitting at least a first payload message including the payload data, allowing the mobile terminal to reject reception of the payload data.

In a preferred embodiment, the method further comprises the steps of receiving a request from the mobile terminal for transmitting the payload data; and transmitting the payload data to the mobile terminal in response to the received request.

Consequently, the payload data is only transmitted if the mobile terminal has acknowledged the receipt and successful verification of the header data, thereby avoiding unnecessary transmission of payload data.

In another preferred embodiment, the method further comprises the steps of processing the payload data to be uploaded into the mobile terminal;

generating a cryptographic data item for the processed payload data; and transmitting the cryptographic data item as a part of the header data.

Hence, as the cryptographic data item is generated on the basis of the processed data, for example on the basis of compressed data, the receiving mobile terminal may verify the data prior to further processing, e.g. decompressing, it, thereby increasing the efficiency of the method, as no unnecessary processing of incorrect data occurs at the receiver.

The invention further relates to a system for loading data into a mobile terminal, the system comprising a loading station and the mobile terminal the loading station including first transmitting means for transmitting data to the mobile terminal, the data comprising payload data and header data;

the mobile terminal including first receiving means for receiving said data from the loading station; and processing means adapted to accept the data conditioned on a verification process based on the header data;

characterised in that the loading station is adapted to transmit a header message including the header data before transmitting the payload data;

the mobile terminal is adapted to receive the header message from the loading station, to verify the received header data and to cause the first receiving means to receive the payload data, if the header data is verified successfully.

The term loading station comprises any electronic equipment including computers, such as stationary and portable PCs, stationary and portable radio communication equipment.

The term mobile terminal comprises all portable radio communication equipment and other handheld or portable devices. The term portable radio communication equipment includes all equipment such as mobile telephones, pagers, communicators, i.e. electronic organisers, smart phones, personal digital assistants (PDAs), handheld computers, or the like.

The terms receiving means and transmitting means include any suitable communications means, where the term communications means comprises circuitry and/or devices suitable for enabling the communication of data between the loading station and the mobile terminal, e.g. via a wired or a wireless data link. Examples of such communications means include a network interface, a network card, a radio transmitter/receiver, a cable modem, a telephone modem, an Integrated Services Digital Network (ISDN) adapter, a Digital Subscriber Line (DSL) adapter, a satellite transceiver, an Ethernet adapter, or the like. For example, the mobile terminal may be connected to a loading station via a wired connection or via a short range wireless communications link using electromagnetic signals, such as infrared light, e.g. via an IrDa port, radio-based communications, e.g. via Bluetooth transceivers, or the like. The data may further be loaded over-the-air, i.e. via a radio interface of the mobile terminal for connecting it to a wireless telecommunications network, such as a Cellular Digital Packet Data (CDPD) network, a Global System for Mobile (GSM) network, a Code Division Multiple Access (CDMA) network, a Time Division Multiple Access Network (TDMA), a General Packet Radio service (GPRS) network, a Third Generation network, such as a UMTS network, or the like.

The term processing means comprises general- or special-purpose programmable microprocessors, Digital signal Processors (DSP), Application Specific Integrated Circuits (ASIC), Programmable Logic Arrays (PLA), Field Programmable Gate Arrays (FPGA), etc., or a combination thereof.

The invention further relates to a mobile terminal comprising receiving means for receiving data from a loading station, the data comprising payload data and header data; and processing means adapted to accept the received data conditioned on a verification process based on the header data;

characterised in that the receiving means is further adapted to receive a header message including the header data from the loading station; and the processing means is further adapted to verify the received header data; and to cause the receiving means to receive the payload data if the header data is verified successfully.

The invention further relates to a loading station for uploading data into a mobile terminal, the loading station comprising transmitting means for transmitting data to the mobile terminal, the data comprising payload data and header data for use by the mobile terminal in a verification process when accepting the data;

characterised in that the transmitting means is further adapted to transmit a header message including the header data to be verified by the mobile terminal before transmitting the payload data, allowing the mobile terminal to reject reception of the payload data.

In a preferred embodiment, the loading station comprises a first device including a secure memory for storing a private key, and second processing means for generating a cryptographic data item; and a second device comprising second processing means for generating the header data including the generated cryptographic data item.

When the first device is a smart card, a secure memory is provided which may be removably connected with, e.g. inserted in, the second device, thereby allowing an easy and secure way of key management and configuration of the loading station.

The invention further relates to a computer program comprising program code means adapted to perform, when running on a mobile terminal or a loading station, the steps of a respective one of the methods described above and in the following. The computer program may be embodied on a computer-readable medium. The computer program may further be embodied as a data signal on a carrier wave, e.g. as a data signal transmitted via a communications network.

The terms storage medium and computer-readable medium comprise magnetic tape, optical disc, digital video disk (DVD), compact disc (CD or CD-ROM), mini-disc, hard disk, floppy disk, ferro-electric memory, electrically erasable programmable read only memory (EEPROM), flash memory, EPROM, read only memory (ROM), static random access memory (SRAM), dynamic random access memory (DRAM), synchronous dynamic random access memory (SDRAM), ferromagnetic memory, optical storage, charge coupled devices, smart cards, PCMCIA card, etc.

The invention will be explained more fully below in connection with preferred embodiments and with reference to the drawings, in which.

Figure 1:
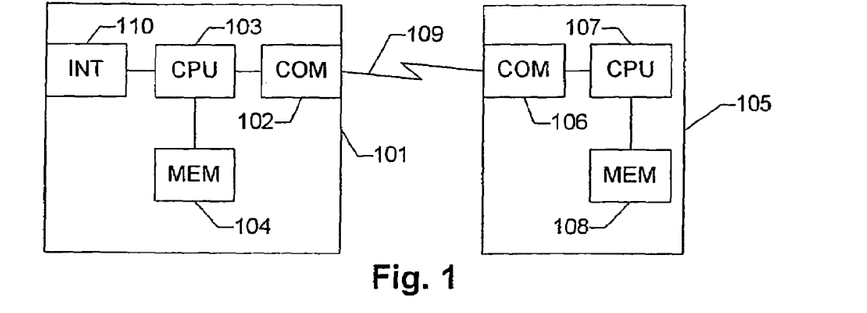
FIG. 1 shows a block diagram of a system for loading data into a mobile station.

FIG. 1 shows a block diagram of a system for loading data into a mobile station. The system comprises a loading station 101 and a mobile terminal 105. The loading station comprises a storage medium 104 for storing the payload data to be loaded into the mobile terminal, additional information to be transmitted to the mobile terminal as described in connection with FIGS. 3, 7a-b, one or more private keys for calculating a cryptographic checksum, and/or other attributes for use in the processing of the payload data. The loading station further comprises a processing unit 103 which is adapted, e.g. by software loaded from the storage medium 104, to process the payload data, e.g. compress and/or encrypt the payload data and/or divide it into blocks. The processing unit 103 is further adapted to generate header data, including the generation of one or more cryptographic checksums. Furthermore, the processing unit is adapted to control the transmission of the header and payload data to the mobile station 105. The processing unit 103 may comprise a general- or special-purpose programmable microprocessor, Digital Signal Processor (DSP), Application Specific Integrated Circuit (ASIC), Programmable Logic Array (PLA), Field Programmable Gate Array (FPGA), etc., or a combination thereof. The loading station further comprises a communications unit 102 comprising circuitry and/or devices suitable for enabling the loading station to communicate data with the mobile terminal via a wired or wireless communications link 109 such as a direct data link, a communications network, or the like. Examples of such communications units include a network interface, a network card, a radio transmitter/receiver, a Bluetooth transceiver, an infrared port, an IrDa port, a cable modem, a telephone modem, an Integrated Services Digital Network (ISDN) adapter, a Digital Subscriber Line (DSL) adapter, a satellite transceiver, an Ethernet adapter, or the like. Accordingly, the communications link 109 may be a short-range wireless communications link using electromagnetic waves. Examples of such communications links include a Bluetooth connection or another connection based on radio frequencies, infrared, microwave, or the like. The communications link may further be a wired connection, e.g. a serial connection, and USB connection, or the like. In yet another embodiment, the connection may be established via a communications network, such as a local area network, a cellular network, the Internet, or the like. The loading station 101 may further comprise a further interface 110, such as a network interface, a floppy disk drive, a CD drive, or the like, enabling the loading station to receive payload data to be loaded into the loading station. The payload data may be received from a payload provider, e.g. a software provider, via a communications network, e.g. the Internet, or on a storage medium, such as a CD, a floppy disk, a memory card, or the like. The received payload is stored on the storage medium 104, possibly after a verification process and/or further processing. The loading station may be a conventional, suitably programmed computer, e.g. a PC, comprising a suitable communications interface. A preferred embodiment of a loading station will be described in connection with FIG. 6.

In another embodiment, the loading station receives the payload data and the header information from a remote computer, e.g. a personal computer, a work station, a network server, etc. For example, the data may be received via a computer network, e.g. the Internet, a local area network, an intranet, an extranet, etc., or by any other suitable means, e.g. on a computer-readable medium such as a floppy disk, a CD ROM, etc. In this embodiment, the header generation, the calculation of message digests and the encryption are performed by the remote computer rather than the loading station. The loading station, e.g. a personal computer, performs, in cooperation with the mobile terminal, the loading of the data into the mobile terminal, e.g. via a serial connection, an infrared port, a Bluetooth or other radio connection, or the like. Hence, in this embodiment, the loading station only performs the tasks of initially transmitting the header information and, subsequently, transmitting the payload data, preferably as individual blocks of payload data.

The mobile terminal 105 comprises a corresponding communications unit 106 comprising circuitry and/or devices suitable for enabling the mobile terminal to communicate data with the loading station. The mobile terminal further comprises a processing unit 107, e.g. a general- or special-purpose programmable microprocessor, Digital Signal Processor (DSP), Application Specific Integrated Circuit (ASIC), Programmable Logic Array (PLA), Field Programmable Gate Array (FPGA), etc., or a combination thereof. The processing unit 107 is adapted, e.g. by software loaded from the storage medium 108 of the mobile terminal, to receive the header data and payload data from the loading station, to analyze and verify the header information, and to load the payload data into the storage medium 108. If applicable, the processing unit 107 is further adapted to process the payload data, e.g. uncompress or decrypt it.

Figure 2:
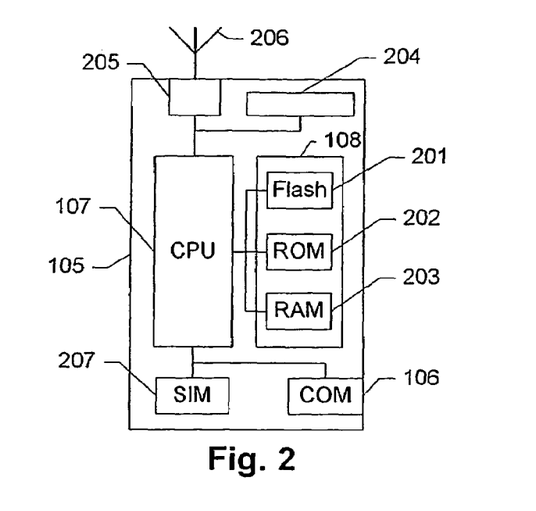
FIG. 2 shows a block diagram of an example of a mobile station.

FIG. 2 shows a block diagram of an example of a mobile terminal. The mobile terminal 101 comprises a processing unit 107, as described above, for controlling the functions of the mobile terminal. The mobile terminal further comprises a radio interface 205 with an aerial 206 for transmitting and receiving data to/from a wireless communications network, e.g. a cellular network. The mobile terminal further comprises a user interface 204, e.g. a display, such as an LCD, or the like, a keypad, or other input means, such as a touch screen, or the like. The user interface may be used during the loading process, if the loading is combined with an interactive authentication/approval procedure which requires an input from the user, e.g. the entering of a password, a PIN, or the like. The mobile terminal may further comprise a subscriber identity module (SIM) 207 including memory for storing subscriber identity information, a telephone number, and other data related to a user's subscription with a cellular network operator. The mobile terminal further comprises a storage medium 108 which may comprise a RAM section 203, a ROM section 202 and a section 201 comprising flash memory. The payload data received from the mobile terminal may be loaded in the flash section and/or the RAM section of the memory. Alternatively or additionally, the storage medium of the mobile terminal may comprise other types of memory, such as EPROM, EEPROM, or the like, or other types of storage media, such as optical disc, digital video disk (DVD), compact disc (CD or CD-ROM), mini-disc, hard disk, ferromagnetic memory, optical storage, charge coupled devices, PCMCIA cards, etc. Correspondingly, the payload data may be loaded in any of the alternative memory types and/or storage media. In one embodiment of the invention, the payload data received from the loading station may be loaded into the memory of the SIM 207. Finally, the mobile terminal comprises a communications unit 106 as described above, e.g. a Bluetooth transceiver, an IrDa port, an USB adapter, a cable connector, or the like. Alternatively, the radio interface 205 may be used to receive the data over the air via a cellular network. For example, the mobile terminal may be any portable radio communication equipment, where the term portable radio communication equipment includes all equipment such as mobile telephones, pagers, communicators, i.e. electronic organisers, smart phones, personal digital assistants (PDAs), handheld computers, or the like.

Figure 3:
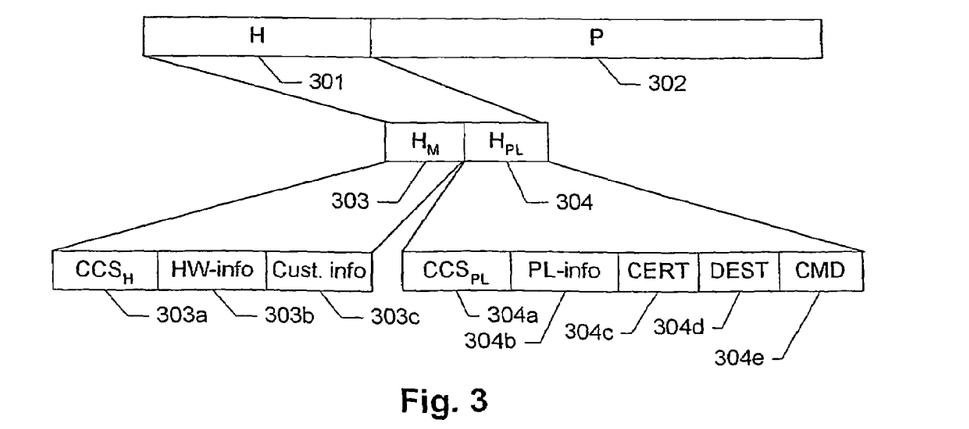
FIG. 3 illustrates a data format according to an embodiment of the invention.

FIG. 3 illustrates a data format according to an embodiment of the invention. The data comprises a header section 301 and a payload section 302. The payload section 302 comprises the actual payload data to be loaded into the mobile terminal. The payload data may comprise software, such as application software, preloader software for organizing and/or controlling the loading of other software, parts of the operating system of the mobile terminal, or the like. Alternatively or additionally, the payload data may comprise other data, e.g. data for storage into the RAM section 203 of the mobile terminal, the SIM 207, or another type of storage medium in the mobile terminal. As will be described in connection with FIGS. 7a-b, the payload data may further be divided in smaller segments. The header section 301 comprises information about the payload data, information about the mobile terminal, control parameters determining how the mobile terminal should process the data, and cryptographic information. According to the embodiment of FIG. 3, the header data is split up in a manufacturer header 303 controlled by the manufacturer of the mobile terminal and a payload header 304 controlled by the provider of the payload. The manufacturer header 303 comprises a cryptographic checksum (CCS) 303a including a message digest encrypted with a private key of the loading station. The cryptographic checksum 303a may be used by the receiving mobile terminal to verify the integrity and authenticity of the header 301. The manufacturer header further comprises hardware information 303b, such as the type of chip set of the mobile terminal. The manufacturer header may further comprise information 303c about the payload provider, such as a provider ID or the like. It is understood that, alternatively or additionally, other types of information may be included in the manufacturer header. For example, the header may comprise a signed key for use by the mobile terminal during the subsequent verification of the payload. The payload header 304 comprises a cryptographic checksum 304a for use by the mobile terminal to verify the received payload data. The payload header further comprises payload information 304b, such as a software version, information about compatible types of mobile terminals, e.g. mobile terminals of predetermined manufacturers and/or predetermined models, or the like. The payload header further comprises certificates 304c, such as one or more public keys for use by the mobile terminal during the verification of the current and/or future payloads. Furthermore, the payload header 304 comprises destination information 304d informing the mobile terminal about where to load the received payload, e.g. in which memory section, at which address, etc. The payload header 304 further comprises a command section 304e which may comprise access control lists, commands, load options, such as the type of compression used, whether the payload data should be stored contiguously, in individually addressed areas of memory, or the like. It is understood that, alternatively or additionally, other types of information may be included in the payload header. It is further understood that another division of the header information may be used, including embodiments where the header 301 is not divided at all. The headers 303 and 304 may be transmitted as one message or separately from each other. It is further understood, that the header may be further split up into smaller packets prior to transmission according to the communications protocol used, e.g. by lower layers of the communications stack. Correspondingly, the header may be recombined at the receiver by the lower levels of the communications stack. According to the invention, at least the header 303 is transmitted in a message prior to transmitting the payload. The payload header 304 may be generated by the payload provider and received by the loading station together with the payload data. Alternatively, the payload header may be generated by the loading station based on information provided by the payload provider.

Figure 4:
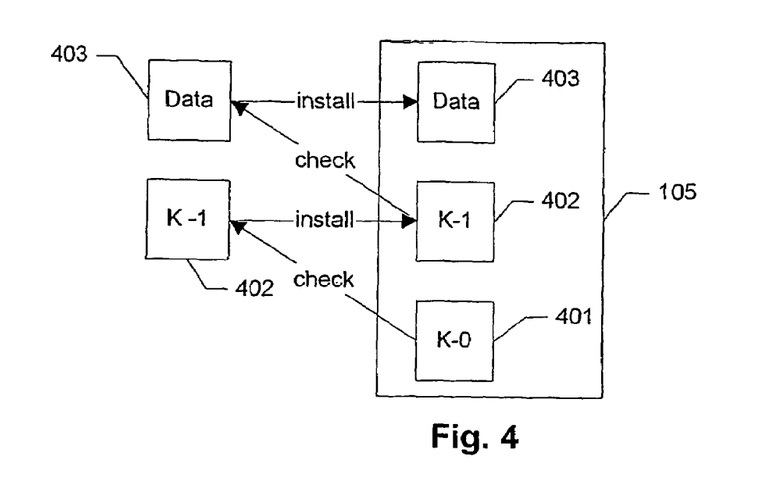
FIG. 4 illustrates a hierarchical key structure for use with an embodiment of the invention.

FIG. 4 illustrates a hierarchical key structure for use with an embodiment of the invention. The security mechanism realizes a chain of trust. The mechanism provides control over the mobile terminal to the manufacturer of the mobile terminal, or another suitable authority. However, at the same time, the mechanism allows the delegation of control over what software or data may be loaded to one or more software providers. The mechanism is based on public-key cryptography. A public root key 401 of the manufacturer is stored in the mobile terminal 105, e.g. in the ROM section 202 of the memory 108, in a special on-chip memory of the processing unit 107, or the like. The root key 401 may then be used to verify a public key 402 of a software provider to be installed in the mobile terminal 105, e.g. in the flash section 201 of the storage medium 108. The public key is encrypted or signed using a private key of the manufacturer which corresponds to the public root key 401. When the encrypted public key 402 is received by the mobile terminal 105, e.g. as a part of the header data 301 or during a separate loading process, the public root key 401 is used to verify the authenticity of the public key 402 before it is installed in the mobile terminal. Additionally, at each start-up of the mobile terminal, the public root key 401 may be used to verify the certificate of the public key 402. Once installed, the public key 402 may subsequently be used to verify received payload data 403 which is signed with a corresponding private key of the software provider. Hence, according to this embodiment, the software provider does not need access to the manufacturer's private key, and the manufacturer does not need access to the private key of the software provider, in order to securely install the software. Hence, it is an advantage of using a public key mechanism that a hierarchical key structure may easily be implemented. It is a further advantage of this embodiment that several public keys 402, e.g. corresponding to different payload providers may be installed in the mobile terminal. Furthermore, the private root key corresponding to the public root key 401 is only used for encrypting or signing the public key(s) 402 and not for signing the actual payload, thereby providing a high protection of the root key. It is noted that the above structure may be extended, e.g. by introducing additional levels of keys.

Figure 5:
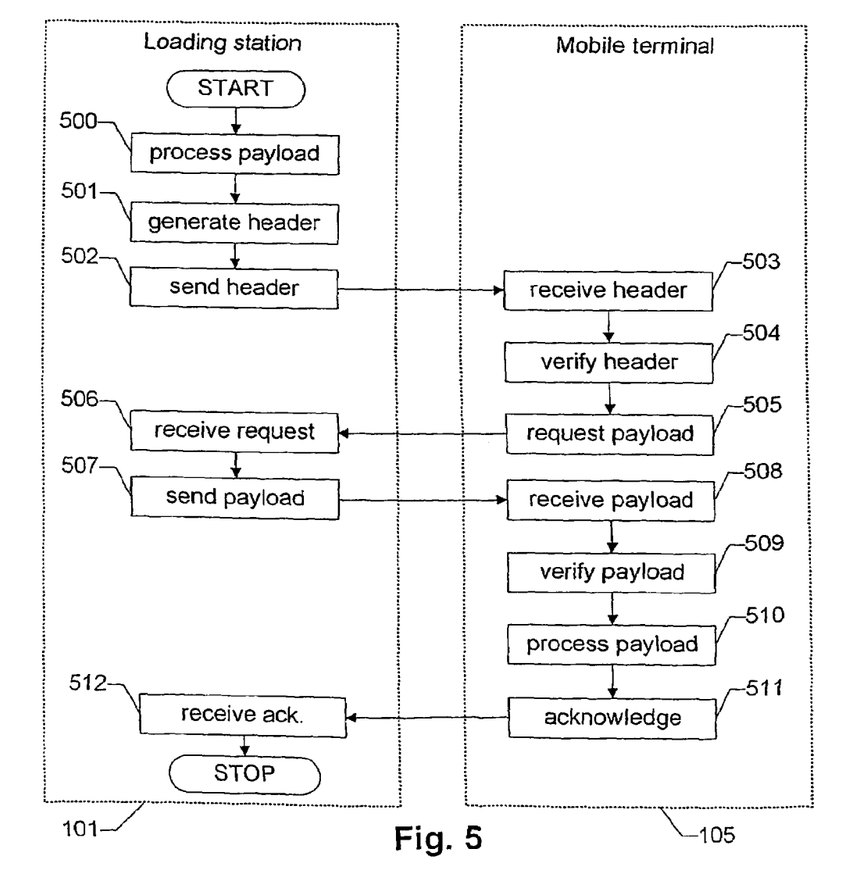
FIG. 5 shows a flow diagram of a method of loading data into a mobile terminal according to an embodiment of the invention.

FIG. 5 shows a flow diagram of a method of loading data into a mobile terminal according to an embodiment of the invention. In an initial step 500, the loading station 101 prepares the payload. This step may include a compression of the payload in order to obtain a more efficient transmission and a less complex calculation of cryptographic checksums. Alternatively or additionally, the loading station may encrypt the payload in order to reduce the risk of an unauthorised interception of the payload during transmission. Subsequently, in step 501, the loading station generates header information including software information, requirements on the execution environment, etc. This step further includes the calculation of one or more cryptographic checksums, e.g. a message digest calculated over the header and encrypted with a private key of the loading station, or another cryptographic checksum. In this step any suitable cryptographic method for calculating a message digest may be used, such as MD-5, SHA-1, or the like, preferably in combination with a public-key encryption method, such as RSA, DSA, or the like. Alternatively or additionally, the header may include a cryptographic checksum calculated over both the header and the payload. In step 502, the generated header is transmitted to the mobile terminal. After receiving the header in step 503, the mobile terminal verifies, in step 504, whether the header information is correct. This verification may include the checking of the cryptographic checksum over the header using a public key stored in the mobile terminal. The verification process may further comprise a verification of the software version, a comparison of the compatible execution environment with the execution environment of the mobile terminal, e.g. a comparison of CPU types, mobile terminal type, operating system, or the like. If the header information is not verified successfully, the loading process is aborted, thereby avoiding an unnecessary transmission of incorrect software. In this case, an error message may be sent to the loading station, possibly triggering a re-transmission, e.g. with another software version, or the like. If the header information is verified successfully, in step 505, the mobile terminal send a request for the actual transmission of the payload to the loading station. Upon receipt of the request in step 506, the loading station initiates the transmission of the payload in step 507. Additionally, in step 507 destination information may be transmitted indicating to the mobile terminal where to store the received data. In another embodiment of the invention, the mobile terminal may not send a request. In this case, the loading station may, for example, automatically start transmitting the payload after a predetermined time after sending the header. If the header has not been verified successfully, the mobile station may simply discard the payload upon receipt, thereby avoiding storing invalid data/software and potentially overwriting existing data/software. However, in a preferred embodiment, the transmission of the payload is triggered by a request from the mobile terminal, thereby avoiding unnecessary transmissions. Upon receipt of the payload (step 509), the mobile terminal verifies the payload in subsequent step 510. This verification step may comprise the verification of a cryptographic checksum calculated over the header and the payload or another cryptographic method for verifying the authenticity and/or integrity of the received data. If the payload is verified successfully, in step 510 the payload may be further processed, e.g. uncompressed, and stored in the target storage area as indicated by the received destination information. Furthermore, an acknowledgment may be sent to the loading station informing the loading station, that the payload is received successfully. Hence, when the loading station has received this receipt in step 512, the loading process is completed. Alternatively, the mobile terminal may not return an acknowledgement. For example, a message may be displayed on the display of the mobile terminal instead, thereby indicating to a user that the loading process is completed.

Especially if the payload includes software, it is particularly advantageous that the received payload is processed, e.g. uncompressed, only after it is verified, because this ensures that the software is not stored in an executable form until it is verified. This is even more advantageous, if the same storage area is used both as intermediate storage prior to the verification and as a final storage area from which the executable software subsequently is loaded for execution. For example, the received software may be stored unprocessed in flash memory, subsequently loaded from flash memory for verification and processing. Upon successful verification, the relevant blocks of flash memory may be erased, and the verified software may be processed into the same blocks of flash memory, but now in executable form.

Figure 6:
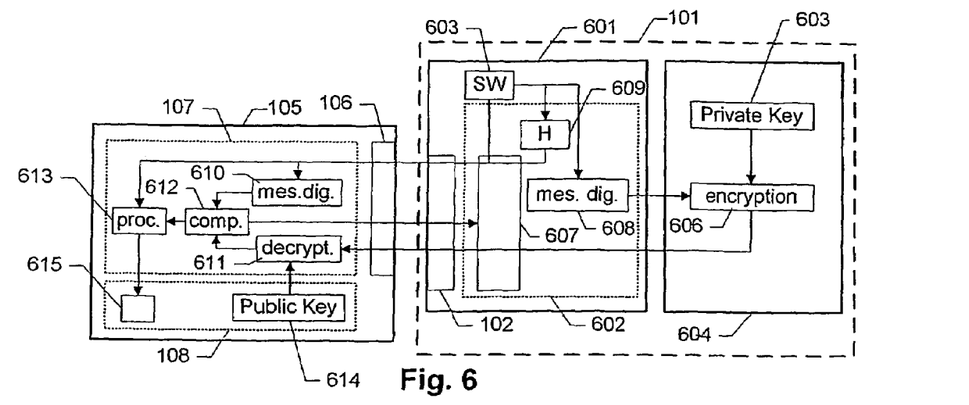
FIG. 6 shows a block diagram of a system for loading data into a mobile station according to an embodiment of the invention.

FIG. 6 shows a block diagram of a system for loading data into a mobile terminal and the corresponding security functionality according to an embodiment of the invention. The system comprises a loading station 101 and a mobile terminal 105, e.g. a mobile terminal as described in connection with FIG. 2. The mobile terminal comprises a processing unit 107 which provides functionality 610 for calculating a message digest of header data and payload data which is received from the loading station via the communications unit 106. The processing unit 107 further provides functionality 611 for extracting and decrypting a cryptographic checksum from the received header and the received payload data, resulting in respective decrypted message digests. The decryption may be performed using, for example, an RSA algorithm and on the basis of a public key stored in a section 614 of the storage medium 108 of the mobile terminal. Furthermore, the processing unit 107 provides functionality 612 for comparing the calculated and the decrypted message digests in order to verify the authenticity and integrity of the received header/payload. If the calculated message digest and the decrypted message digest are not the same, the received header/data may differ from the original header/data, or the header/data was not signed with a private key corresponding to the public key used for decryption. Hence, the received header/payload is rejected. If the header is verified successfully, the processing unit 107 causes a message to be returned to the loading station requesting transmission of the payload. Finally, the processing unit provides functionality 613 for the further processing of the received payload, such as decompression and storing in a corresponding section 615 of the storage 108. The above functionality may be implemented in software or, alternatively, the described features may be implemented by hardwired circuitry instead of software or in combination with software. The loading station 101 comprises a base unit 601, e.g. a suitably programmed personal computer, or another suitable device and an encryption module 604. The base unit comprises memory 603 for storing the payload data, e.g. software, to be loaded into the mobile terminal, and a communications circuit 102 for communicating the data with the mobile terminal, e.g. as described in connection with FIG. 1. The base unit 601 further comprises a processing unit 602 providing functionality 609 for generating a header for the stored payload data, and functionality 608 for calculating one or more message digests over the payload and the corresponding header. The encryption module 604 comprises a processing unit 606 for encrypting the calculated message digest(s) based on a private key stored in a secure memory 605 of the encryption module, e.g. using an RSA algorithm or another suitable cryptographic method. The processing unit 602 of the base unit 601 further provides functionality 607 for controlling the transmission of the resulting header and payload to the mobile terminal via the communications circuit 102 of the base unit. In one embodiment, the encryption unit is implemented as a smart card, and the base unit 601 is equipped with a card reader. Alternatively, another interface between the encryption unit and the base unit may be used. It is an advantage of this embodiment that a loading station may easily be configured with a new private key, and the private key is securely stored in the encryption unit.

It is noted that different modular embodiments of the loading stations may be used. For example, the encryption unit may also calculate the message digest.

Figure 7A:
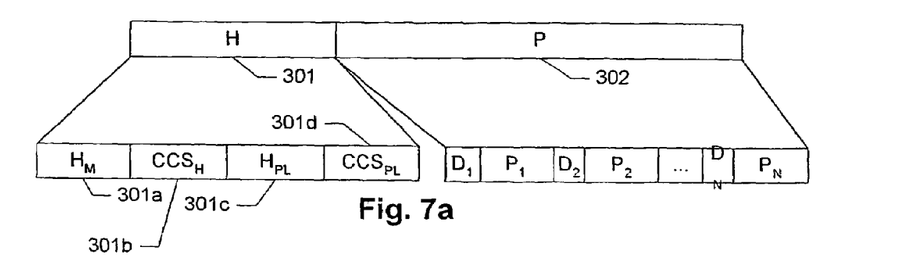
FIGS. 7a-c illustrate examples of data formats according to an embodiment of the invention.
Figure 7B:
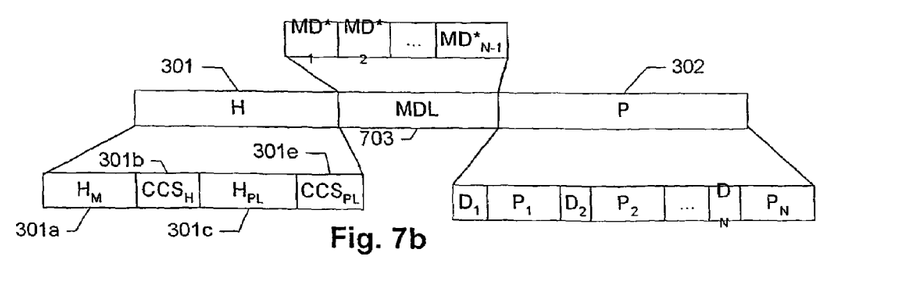
Figure 7C:
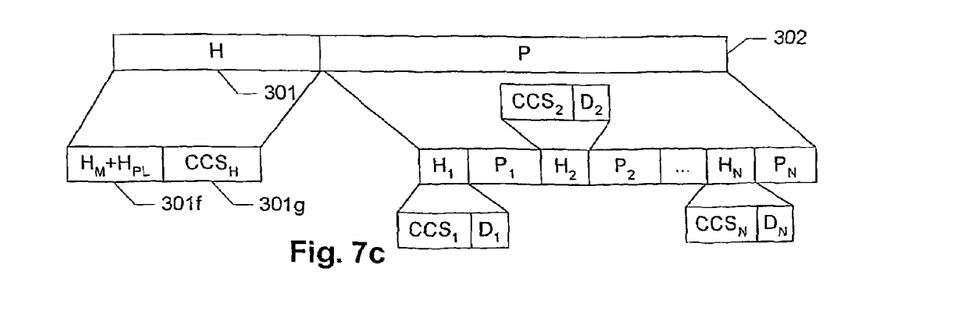

FIGS. 7a-c illustrate examples of data formats according to an embodiment of the invention. In the examples of FIGS. 7a-c, the payload data comprises software to be loaded into the flash memory of a mobile terminal. As mentioned above, flash memory is a type of constantly-powered nonvolatile memory that can be erased and reprogrammed in units of memory called blocks. It is a variation of electrically erasable programmable read-only memory (EEPROM). However, while EEPROM is erased and rewritten at the byte level, the flash memory can be written to in block sizes, making it easy to update. For example a block may be 64 kbyte large. The payload 302 in FIGS. 7a-c is divided in N blocks $P_1, P_2, \ldots, P_N$ of equal size corresponding to the block size of the flash memory of the mobile terminal. Each block is prefixed by a destination information $D_1, D_2, \ldots, D_N$, indicating the block addresses of the target blocks in flash memory where the received payload blocks should be stored. The destination information may comprise block numbers or addresses. In case of consecutive blocks, only the starting address of the first block $P_1$ is necessary. In this case, $D_1$ may provide the start address and the remaining $D_i$'s may be set to zero or be omitted. Preferably, the header information comprises an indication as to how the mobile terminal should interpret the destination list. In an alternative embodiment, the destination information may be included in the header, thereby ensuring that the destination information is verified cryptographically prior to loading the data to that destination. This may be particularly advantageous, if the payload comprises software which is to be loaded into IRAM, in order to avoid an unauthorised overwriting of existing software. If the size of the payload data is not a multiple of the block size, the data may be padded, e.g. with zeros. Now referring to FIG. 7a, the header section 301 comprises a manufacturer-related header section 301a with a corresponding header cryptographic checksum 301b comprising a calculated an encrypted message digest over the header information 301a, i.e. $CCS_H=RSA_{k1}(SHA1(H_M))$, i.e. a message digest of the header section 301a computed according to the Secure Hash Algorithm (SHA-1) and encrypted using an RSA algorithm with a private key k1 of the loading station, preferably the private key of the manufacturer. In one embodiment, the message digest $MD_H=SHA1(H_M)$ is padded in order to achieve an appropriate length for the RSA operation, i.e. $CCS_H=RSA_{k1}(SHA1(H_M)|padding)$, where '|' symbolizes concatenation of bit strings. The padding may be performed according to any suitable padding scheme, e.g. PKCS#1 padding. In one embodiment, the header cryptographic checksum is further calculated over the public key to be used for decrypting the payload message digests at the mobile terminal. The header information in 301a may comprise information which is related to the type of mobile terminal and independent of the actual content of the payload. The header 301 further comprises a payload-related header 301c comprising information such as software version, a specification of compatible execution environments, a command section indicating parameters used by the mobile terminal during the processing of the payload. For example, the information may comprise the number N of payload blocks, and information about whether the payload blocks correspond to a sequence of consecutive blocks or whether they are individual, scattered blocks. The parameters may further comprise information about whether and what type of compression and/or encryption is used, the length of the payload, etc. Finally, the header comprises a cryptographic checksum 301d including an encrypted list of a message digest $MD_{PL}$ of the payload header and N payload message digests, i.e. $CCS_{PL}=RSA_{k2}(MD_{PL}|MD_1|MD_2|\ldots|MD_N)$, each message digest $MD_1, MD_2, \ldots, MD_N$ being related to a corresponding one of the blocks $P_1, \ldots, P_N$. The list is encrypted using the software provider's private key k2. In one embodiment, $MD_1$ is calculated over the header sections 301a-c, the destination information $D_1$, and the first payload block $P_1$, i.e. $MD_1=SHA1(H_M|CCS_H|H_{PL}|D_1|P_1)$, where '|' symbolizes concatenation of bit strings. The remaining message digests, i.e. $MD_2, \ldots, MD_N$ are calculated accordingly, i.e.

$$MD_i=SHA1(H_M|CCS_H|H_{PL}|D_1|P_1|\ldots|D_i|P_i),$$
$$i=2,\ldots,N.$$

It is noted that alternatively to using different private keys for the calculation of $CCS_H$ and the block cryptographic checksums, respectively, the same private key may be used. For example, if the entire header information 301 is generated by one authority, the private key of that authority may be used.

It is further noted that the message digests $MD_1, \ldots, MD_{N-1}$ may be truncated, e.g. to one byte, in order to reduce the size of the header. This implies that the probability to succeed with an attempt to insert a false block increases, e.g. to a probability of 1/16 in the case of a truncation to one byte. However, such a modification would be noticed during the final check of $MD_N$.

Now referring to FIG. 7b, the data format comprises a header section 301, and a payload section 302 with N blocks of payload data as described above. Furthermore, the data format comprises a section 703 including a list of truncated block message digests $MD^*_1, \ldots, MD^*_{N-1}$ of the payload blocks $P_1, \ldots, P_{N-1}$. As described above, the message digests may be calculated according to $$MD_i=SHA1(H_M|CCS_H|H_{PL}|D_1|P_1|\ldots|D_i|P_i),$$
$$i=1,\ldots,N-1.$$

Preferably, the block message digests are truncated to 1 byte, as described in connection with FIG. 7a and as indicated by the asterix '*'. The header section 301 comprises a manufacturer-related header section 301a with a corresponding header cryptographic checksum 301b as described in connection with FIG. 7a. The header 301 further comprises a payload-related header 301c as described in connection with FIG. 7a. Finally, the header comprises a cryptographic checksum 301e including an encrypted list of a message digest $MD_{PL}$ of the payload header 301b, the full block message digest $MD_N$ of the last payload block $P_N$, and a message digest $MD_L$ of the list of message digests 302, i.e. $CCS_{PL}=RSA_{k2}(M_{PL}|MD_N|MD_L)$. For example, each of the message digests may include 20 bytes. The list is encrypted using the software provider's private key k2. In particular, the non-truncated block message digest $MD_N$ allows a secure final verification of the received data even though the previous block message digests $MD^*_1, \ldots, MD^*_{N-1}$ are truncated.

It is an advantage of this embodiment that only the message digest $MD_L$ of the list 302 and the message digest $MD_N$ need to be encrypted rather than all the block message digests $MD^*_1, \ldots, MD^*_{N-1}$, thereby reducing the size of the message significantly. This is a particular advantage for large number of blocks N.

Now referring to FIG. 7c, instead of including the block cryptographic checksum of the list of message digests in the header, the encrypted message digests $CCS_i=RSA_{k2}(MD_i)$ may be prefixed the individual blocks. However, it is an advantage of the embodiments of FIGS. 7a-b, that only one decryption step needs to be performed in order to retrieve the message digests, thereby reducing the computational requirements. According to this embodiment, the header comprises a header section 301f including both the manufacturer-related information and the payload-related information. Accordingly, the corresponding header cryptographic checksum 301g is calculated over the header section 301f.

Figure 8A:
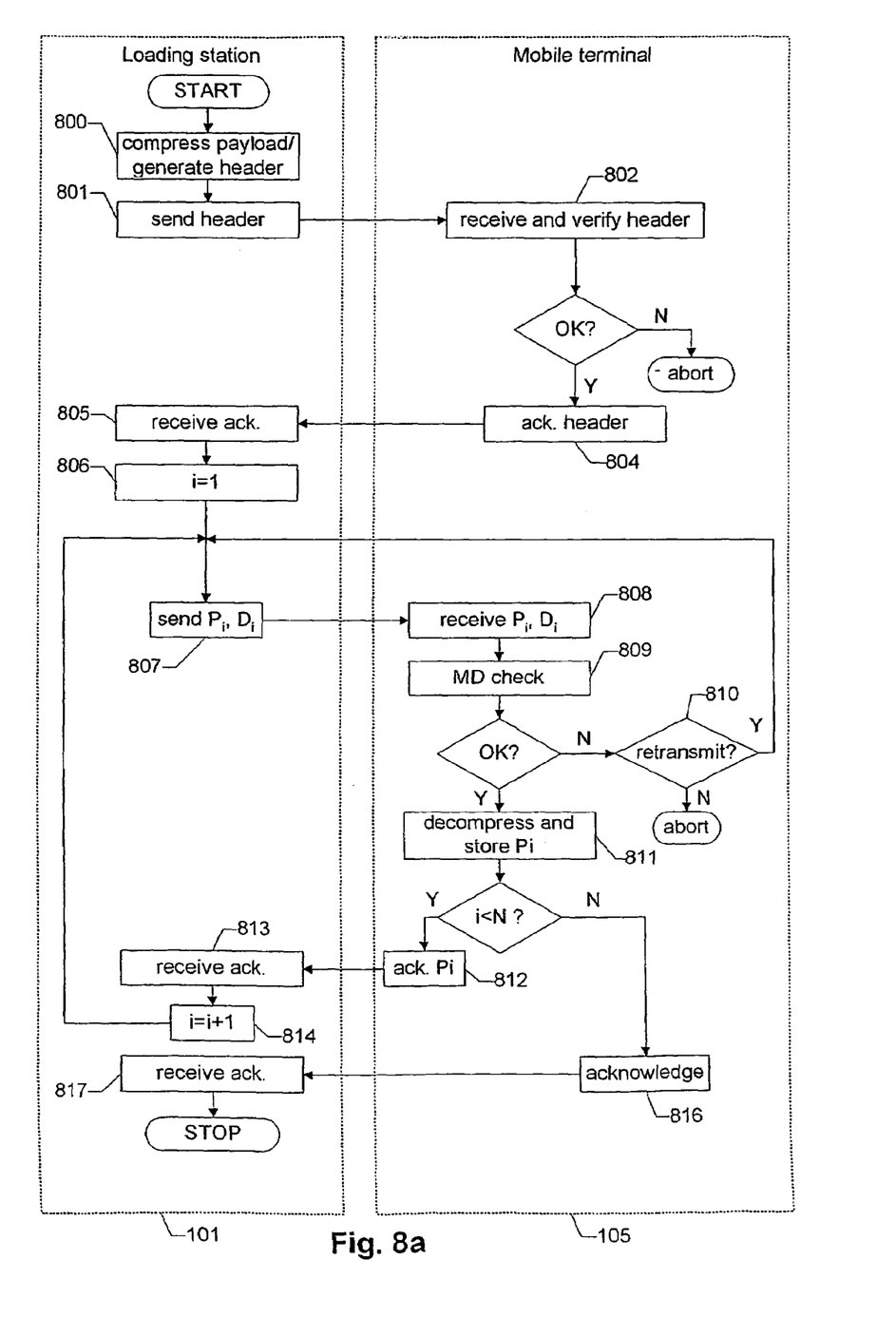
FIGS. 8a-b show flow diagrams of examples of a method of loading data into a mobile terminal according to an embodiment of the invention.
Figure 8B:
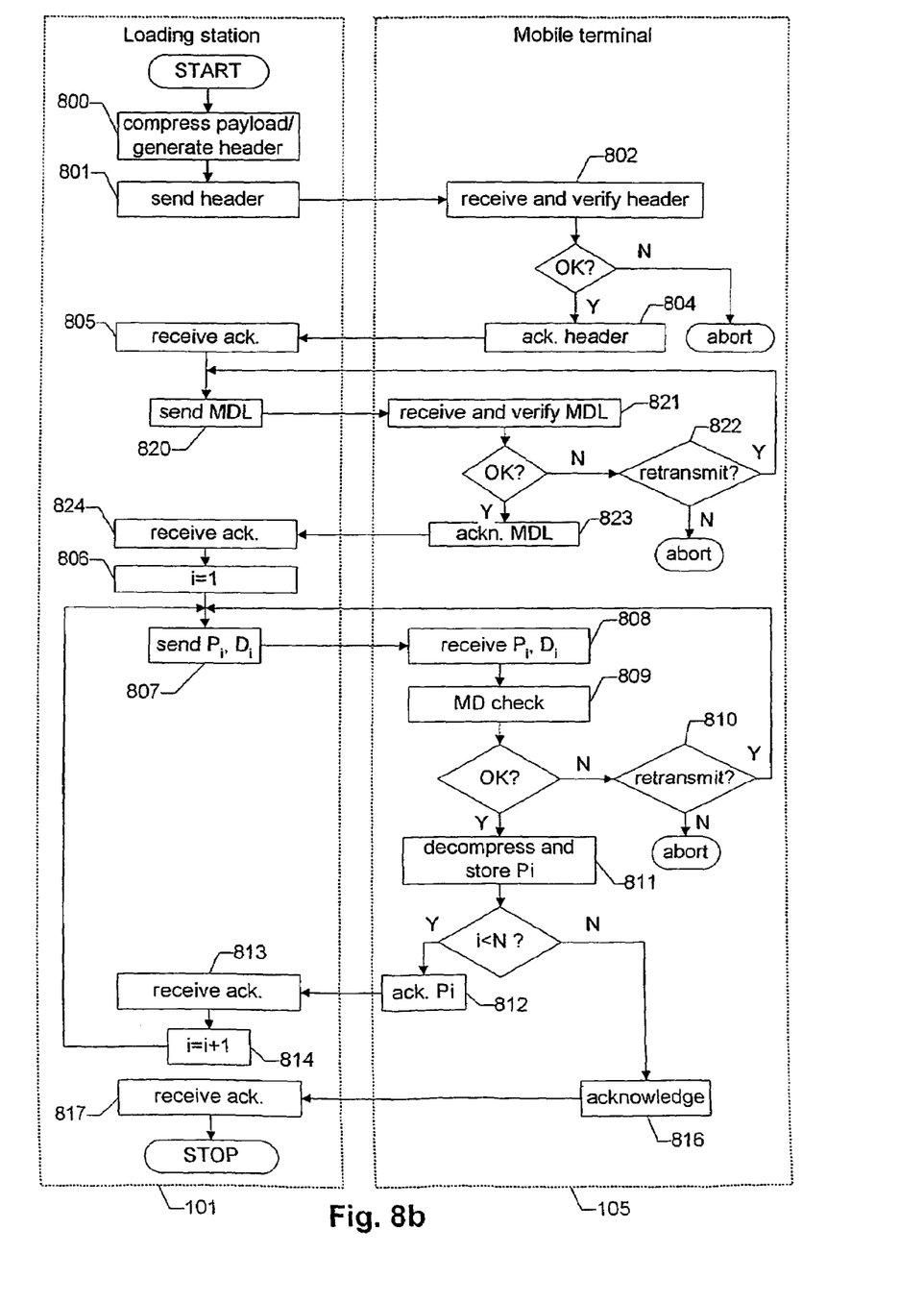

FIGS. 8a-c show flow diagrams of examples of a method of loading data into a mobile terminal according to embodiments of the invention corresponding to the data formats of FIGS. 7a-b, respectively. Referring to FIG. 8a, in the initial step 800, the loading station 101 compresses the payload and generates the header information, e.g. the header information described in connection with FIG. 7a. In another embodiment, the payload may be compressed by the payload provider and received by the loading station in compressed form. In step 801 a communications link is established with the mobile terminal 105, and the header 301 is sent to the mobile terminal using a suitable protocol. The mobile terminal receives the header information in step 802 and extracts the individual header sections 301a-301d of FIG. 7a, i.e. the data of $H_M$ and $CCS_H$, $H_{PL}$, and the encrypted list $CCS_{PL}$ of message digests $MD_{PL}, MD_1, \ldots, MD_N$. The received $CCS_{PL}$ is decrypted using the corresponding public key stored in the mobile terminal and the message digests of the payload header and the block message digests $MD_1, \ldots, MD_N$ are retrieved. Furthermore, the mobile terminal verifies the header information. This verification may comprise a number of different checks, for example:

- The header message digest is calculated over the received header information and the $CCS_H$ included in the header is extracted and decrypted with the corresponding public key stored in the mobile terminal. If the two values are the same, the header is accepted as valid and originating from a trusted source.
- The message digest $MD_{PL}$ is verified.
- Additional parameters, such as type of chip set, type of mobile terminal, etc. are compared to the actual execution environment of the mobile terminal.

If the verification fails, the loading process is aborted. If the verification succeeds, in step 804 an acknowledgment is sent from the mobile terminal to the loading station acknowledging the receipt of the header. In another embodiment, the mobile terminal may send a request for receiving the payload to the loading station. It is noted that in an alternative embodiment the header may be transmitted and verified as two or more messages. For example, the header sections 301a-b comprising the manufacturer header may initially be transmitted. After verification of this information, the payload header 301c-d may be transmitted and verified. Upon receipt of the acknowledgment (step 805), in step 806 the loading station initiates sending the blocks $P_i$, i=1, \ldots, N of payload data, each prefixed by the corresponding destination information $D_i$: Initially a counter is set to i=1. In step 807, the block $P_i$ and the destination information $D_i$ are transmitted from the loading station to the mobile terminal. In step 808, the mobile terminal receives the block $P_i$ and the destination information $D_i$ and loads them into RAM. The corresponding $MD_i$, as extracted from the header information, is already available in RAM. In step 809, the block message digest $MD_i$ is checked. Hence, the message digest is calculated corresponding to the calculation in the loading station, i.e. in the example of FIG. 7a as $$MD_i = SHA1(H_M|CCS_H|H_{PL}|D_1|P_1|\ldots|D_i|P_i), \text{ for } i=1,\ldots,N.$$

Subsequently, the calculated and decrypted values of $MD_i$ are compared with each other. If they differ, the block is rejected and, in step 810, a retransmission is requested, unless a predetermined maximum number of allowed retransmissions is exceeded. In this case, the loading process is aborted.

If the message digests are equal, the block $P_i$ is decompressed and stored in a block of flash memory as indicated by the destination information $D_i$. If the current block is not the final block, i.e. i<N, in step 812, the successful loading of block Pi is acknowledged by sending a corresponding request for the next block to the mobile terminal. Upon receipt of the request (step 813), the loading station increments a corresponding counter (step 814) and iterates by transmitting the next block, starting with step 807. When the last block $P_N$ is loaded successfully, in step 816 a final acknowledgment is sent to the loading station. Upon receipt of the final acknowledgement (step 817), the loading station completes the loading process.

Now referring to FIG. 8b, as described above, the loading station 101 compresses the payload and generates the header information in step 800, e.g. the header information described in connection with FIG. 7b. In another embodiment, the payload may be compressed by the payload provider and received by the loading station in compressed form. In step 801 a communications link is established with the mobile terminal 105, and the header 301 is sent to the mobile terminal using a suitable protocol. The mobile terminal receives the header information in step 802 and extracts the individual header sections 301a-301c, and 301e of FIG. 7b. The header message digest is calculated over the received header information $H_M$ and the calculated message digest is compared with the corresponding value extracted by decrypting the received $CCS_H$. If the two values are the same, the header is accepted as valid and originating from a trusted source. Furthermore, the received $CCS_{PL}$ is decrypted using the corresponding public key stored in the mobile terminal and the message digests $MD_{PL}$, $MD_N$, and $MD_L$ are retrieved. The $MD_{PL}$ may be used to verify the payload header $H_{PL}$ 301c, while the remaining two message digests are stored in RAM for later use. Furthermore, the mobile terminal may further verify the header information as described above. If the verification fails, the loading process is aborted. If the verification succeeds, in step 804 an acknowledgment is sent from the mobile terminal to the loading station acknowledging the receipt of the header. Upon receipt of the acknowledgment (step 805), in step 820 the loading station initiates sending the list 703 of truncated block message digests $MD^*_1, \ldots, MD^*_{N-1}$. Upon receipt of this list, in step 821, the mobile terminal verifies the received list by calculating the corresponding message digest and comparing the result with the previously received value of $MD_L$. If they differ, the list is rejected and, in step 822, a retransmission is requested, unless a predetermined maximum number of allowed retransmissions is exceeded. In this case, the loading process is aborted. If the list is verified successfully, in step 823 an acknowledgement is sent to the loading station. Upon receipt of the acknowledgment (step 824), in step 807 the loading station initiates sending the blocks $P_i$, i=1, . . . , N of payload data, each prefixed by the corresponding destination information $D_i$: Initially a counter is set to i=1. In step 807, the block $P_i$ and the destination information $D_i$ are transmitted from the loading station to the mobile terminal. In step 808, the mobile terminal receives the block $P_i$ and the destination information $D_i$ and loads them into RAM. The corresponding $MD^*_i$, as extracted from the received list, is already available in RAM. In step 809, the block message digest is checked. Hence, the message digest is calculated corresponding to the calculation in the loading station, and the truncated bits of $MD^*_i$ are compared with the corresponding bits of the calculated message digest. If they differ, the block is rejected and, in step 810, a retransmission is requested, unless a predetermined maximum number of allowed retransmissions is exceeded. In this case, the loading process is aborted. If the truncated message digests are equal, the block $P_i$ is decompressed and stored in a block of flash memory as indicated by the destination information $D_i$. If the current block is not the final block, i.e. i<N, in step 812, the successful loading of block Pi is acknowledged by sending a corresponding request for the next block to the mobile terminal. Upon receipt of the request (step 813), the loading station increments a corresponding counter (step 814) and iterates by transmitting the next block, starting with step 807. If the current block is the final block $P_N$, the step 809 of checking the block message digest involves calculating the corresponding message digest, e.g. according to $$MD_N=SHA1(H_M|CCS_H|H_{PL}|D_1|P_1|\ldots|D_N|P_N).$$

In this case, the calculated message digest is compared with the value $MD_N$ which was received as part of the header information and which, preferably, was not truncated. Consequently, as the calculation of $MD_N$ involves all previous payload blocks, a previous erroneous acceptance of one of the blocks P1, . . . , PN-1 due to the truncation of the message digests $MD^*_1, \ldots, MD^*_{N-1}$, may be detected at this point. When the last block $P_N$ is loaded successfully, in step 816 a final acknowledgment is sent to the loading station. Upon receipt of the final acknowledgement (step 817), the loading station completes the loading process.

Alternatively, the destination information and payload message digests may be transmitted in connection with the individual blocks rather than as part of the initial header. This corresponds to the data format of the example of FIG. 7c.

It is an advantage of the embodiments of FIGS. 8a-b that each block of received payload data only needs to be flashed once, i.e. after successful verification and after possible further processing, thereby increasing the efficiency of the method. Furthermore, each block of flash memory is only written to, if the new data is verified, thereby avoiding overwriting previous data with an invalid update.

It is further noted that other methods of calculating a cryptographic checksum, a message digest, or the like, may be employed, such as MD-4, MD-5, or other technologies, such as cyclic redundancy check, etc.

In one embodiment, the keys used for encryption of the header message digest and the block message digests are different keys of a hierarchical trust chain according to which authorities control the different header information and the payload. For example, according to the example of FIG. 4, the root key 401 may be used to decrypt the header cryptographic checksum, while the public key 402 may be used to decrypt the block message digests.

It is an advantage of this embodiment that it allows a differential update of existing software or other payload. For example, if an updated software version differs from the older version in some of the memory blocks, the above method allows the loading to be limited to the loading of the affected blocks, which are flashed in the corresponding memory blocks as dictated by the destination information $D_i$. The generation of a patch comprising the changed blocks may be a part of the processing performed by the loading station before transmitting the header. This processing may be based on information received from the mobile station.

Furthermore, the download may be limited to patches which are actually required. The compression algorithm used may be optimized for patches, thereby reducing the amount of data. Patches are typically scattered changes in the software. Hence, the software update may be represented as a bit string where zeros indicate no changes and ones indicate changes. In this representation, a typical patch update corresponds to an almost zero string. A compression algorithm used for the software update string may thus be optimized for this type of information strings, thereby yielding a very efficient method of downloading software patches.

What is claimed is:

1. A method of loading data into a mobile terminal data comprising payload data and header data, the method comprising the steps of:
   receiving a header message from a loading station by a mobile terminal wherein the header message includes the header data having a cryptographic data item including a cryptographic checksum based on a message digest of the message calculated by a hash function;
   verifying the received header data by the mobile terminal;
   receiving the payload data, if the header data is verified successfully;
   accepting the payload data by the mobile terminal conditioned on a verification process based on the header data, wherein the payload data is divided into a number of blocks of payload data and the blocks of payload data do not carry authentication information;
   wherein receiving the payload data further comprises receiving a number of payload messages each including one of the number of blocks of payload data; and
   wherein accepting the payload data further comprises accepting each of the blocks of payload data by the mobile terminal conditioned on a cryptographic verification process based on a corresponding one of a number of received message digests and accepting the payload data conditioned on a verification of a received message digest calculated from a combination of all blocks of payload data.

2. The method according to claim 1 wherein the number of message digests received comprises at least one of the sequence of message digests received as a part of the header message.

3. The method according to claim 1 wherein the step of accepting each of the blocks of payload data further comprises the step of storing in a storage medium said accepted block of payload data.

4. The method according to claim 3 wherein the storage medium is divided into a number of storage blocks each having a predetermined size; and each of the number of blocks of payload data have a block size corresponding to the size of storage blocks.

5. The method according to claim 4 wherein the payload data comprises an update of existing data loaded in the mobile terminal and the method further comprises the step of only loading the blocks of payload data which differ from a corresponding block of the existing data.

6. The method according to claim 1 wherein each of the message digests is generated from the corresponding block of payload data and from the header message.

7. The method according to claim 1 wherein the cryptographic verification process used in the step of accepting a first block of payload data received after a second block of payload data is further based on a result of a cryptographic verification process used in a previous step of accepting the second block of payload data.

8. The method according to claim 1 wherein the first cryptographic data item includes a first message digest encrypted with a private key of an authority and the step of accepting the data by the mobile terminal further comprises the steps of:
calculating a second message digest of the received header data and the received payload data;
decrypting the first message digest with a public key of said authority; and
comparing the decrypted first message digest with the calculated second message digest.

9. The method according to claim 1 wherein the header data further comprises a signed key to be used in the verification process by the mobile terminal as a public key of the authority distributing the payload data.

10. The method according to claim 1 wherein the header data further comprises a second cryptographic data item, and the step of verifying the header data further comprises the step of performing a cryptographic verification of the header data based on the second cryptographic data item.

11. The method according to claim 1, the method further comprising the step of processing the payload data conditioned on the step of accepting the data by the mobile terminal.

12. The method according to claim 11 wherein the payload data is received in a compressed for; and the step of processing further comprises the step of decompressing the payload data.

13. The method according to claim 1, the method further comprises the step of sending a request for receiving the payload data to the loading station conditioned on a result of the step of verifying the header data.

14. The method according to claim 1 wherein the payload data comprises program code means.

15. The method according to claim 1 wherein the payload data comprises a software patch.

16. A method of uploading data into a mobile terminal, the method comprising the steps of:
transmitting the data by a loading station to the mobile terminal, the data comprising payload data and header data for use by the mobile terminal in a verification process of the header data; wherein transmitting the data further comprises the step of:
transmitting a header message to be verified by the mobile terminal before transmitting at least a first payload message including the payload data wherein the header message includes the header data having a cryptographic data item including a cryptographic checksum based on a message digest of the message calculated by a hash function; and
allowing the mobile terminal to reject reception of the payload data;
dividing the payload data into a sequence of blocks of payload data, wherein the blocks of payload data do not carry authentication information;
generating a sequence of message digests, each message digest being related to a corresponding one of the number of blocks of payload data, wherein one message digest is calculated from a combination of all blocks of payload data; and
transmitting the sequence of message digests and a number of payload messages each including one of the number of blocks of payload data.

17. The method according to claim 16, the method further comprising the steps of:
receiving a request from the mobile terminal for transmitting the payload data; and
transmitting the payload data to the mobile terminal in response to the received request.

18. The method according to claim 16, further comprising the steps of:
processing the payload data to be uploaded into the mobile terminal;
generating a cryptographic data item for the processed payload data; and
transmitting the cryptographic data item as a part of the header data.

19. The method according to claim 16, wherein the step of generating a sequence of message digests further comprises the step of generating each of the message digests from a corresponding block of payload data and from the header message.

20. The method according to claim 16, wherein the step of transmitting the sequence of message digests further comprises the step of transmitting at least one of the sequence of message digests as a part of the header message.

21. The method according to claim 16, wherein the payload data comprises an update of existing data loaded in the mobile terminal; and the method further comprises the step of only transmitting blocks of payload data which differ from a corresponding block of the existing data.

22. A system for loading data into a mobile terminal, the system comprising:
a loading station; and
a mobile terminal;
the loading station including first transmitting means for transmitting data to the mobile terminal, the data comprising payload data and header data wherein the loading station is adapted to transmit a header message before transmitting the payload data wherein the header message includes the header data having a cryptographic data item including a cryptographic checksum based on a message digest of the message calculated by a hash function;
the mobile terminal including first receiving means for receiving said data from the loading station; and
processing means adapted to accept the data conditioned on a verification process based on the header data, wherein the mobile terminal is adapted to receive the header message from the loading station, to verify the received header data and to cause the first receiving means to receive the payload data, if the header data is verified successfully;
the loading station operable to divide the payload data into a sequence of blocks of payload data, wherein such blocks of payload data do not carry authentication information, generate a sequence of message digests, each message digest being related to a corresponding one of the number of blocks of payload data, wherein one message digest is calculated from a combination of all blocks of payload data, and transmit the sequence of message digests and a number of payload messages each including one of the number of blocks of payload data;

the mobile terminal operable to receive the number of message digests the number of payload messages, accept each of the blocks of payload data conditioned on a cryptographic verification process based on a corresponding one of the message digests and accept the payload data conditioned on a verification of the message digest calculated from a combination of all blocks of payload data.

23. A mobile terminal comprising:

receiving means for receiving data from a loading station, the data comprising payload data and header data, the receiving means operable to receive a header message from the loading station wherein the header message includes header data having a cryptographic data item including a cryptographic checksum based on a message digest of the message calculated by a hash function; and processing means operable to accept the received data conditioned on a verification process based on the header data wherein the processing means is further adapted to verify the received header data and to cause the receiving means to receive the payload data if the header data is verified successfully;

wherein the payload data is divided into a number of blocks of payload data, wherein such blocks of payload data do not carry authentication information;

the receiving means operable to receive a number of payload messages each including one of the number of blocks of payload data; and the processing means operable to accept each of the blocks of payload data by the mobile terminal conditioned on a cryptographic verification process based on a corresponding one of a number of received message digests and accept the payload data conditioned on a verification of a received message digest calculated from a combination of all blocks of payload data.

24. A loading station for uploading data into a mobile terminal, the loading station comprising:

transmitting means for transmitting data to a mobile terminal, the data comprising payload data and header data for use by the mobile terminal in a verification process when accepting the data, wherein the transmitting means is further operable to transmit a header message to be verified by the mobile terminal before transmitting the payload data, allowing the mobile terminal to reject reception of the payload data wherein the header message includes the header data having a cryptographic data item including a cryptographic checksum based on a message digest of the message calculated by a hash function;

the loading station further operable to:

divide the payload data into a sequence of blocks of payload data wherein such blocks of payload data do not carry authentication information;

generate a sequence of message digests, each message digest being related to a corresponding one of the number of blocks of payload data, wherein one message digest is calculated from a combination of all blocks of payload data; and transmit the sequence of message digests and a number of payload messages each including one of the number of blocks of payload data.

25. The loading station according to claim 23, wherein the loading station comprises a first device including a secure memory for storing a private key, and second processing means for generating a cryptographic data item; and a second device comprising second processing means for generating the header data including the generated cryptographic data item.

26. The loading station according to claim 25, wherein the first device is a smart card.

27. A computer program comprising program code means embodied on a computer-readable medium adapted to, when executed data processing device, perform the steps of:

receiving a header message from a loading station by a mobile terminal wherein the header message includes the header data having a cryptographic data item including a cryptographic checksum based on a message digest of the message calculated by a hash function;

verifying the received header data by the mobile terminal;

receiving the payload data, if the header data is verified successfully;

accepting the data by the mobile terminal conditioned on a verification process based on the header data, wherein the payload data is divided into a number of blocks of payload data and such blocks of payload data do not carry authentication information;

wherein receiving a header message further comprises receiving a number of payload messages each including one of the number of blocks of payload data; and wherein accepting the data further comprises accepting each of the blocks of payload data by the mobile terminal conditioned on a cryptographic verification process based on a corresponding one of a number of received message digests and accepting the payload data conditioned on a verification of a received message digest calculated from a combination of all blocks of payload data.

28. The computer program according to claim 27 wherein the data processing device is a mobile terminal.

29. The computer program according to claim 27 wherein the data processing device is a loading station.

* * * * *

UNITED STATES PATENT AND TRADEMARK OFFICE
CERTIFICATE OF CORRECTION

PATENT NO. : 7,558,953 B2  
APPLICATION NO. : 10/500742  
DATED : July 7, 2009  
INVENTOR(S) : Osthoff et al.

Page 1 of 1

It is certified that error appears in the above-identified patent and that said Letters Patent is hereby corrected as shown below:

In Column 29, Line 58, in Claim 26, delete "step" and insert -- steps --, therefor.

In Column 22, Line 13, in Claim 25, delete "23," and insert -- 24, --, therefor.

Signed and Sealed this

Twenty-fourth Day of November, 2009

David J. Kappos  
*Director of the United States Patent and Trademark Office*